United States Patent

Mizuno et al.

[11] Patent Number: 5,586,105
[45] Date of Patent: Dec. 17, 1996

[54] OPTICAL DISC CLAMP MECHANISM AND ADAPTER FOR USE IN AN OPTICAL DISC APPARATUS

[75] Inventors: Osamu Mizuno, Osaka; Tohru Nakamura, Katano; Hideki Aikoh, Higashiosaka; Hironori Tomita, Katano; Masanari Mohri, Kobe, all of Japan

[73] Assignee: Matsushita Electric Industrial Co., Ltd., Osaka-fu, Japan

[21] Appl. No.: 149,724

[22] Filed: Nov. 10, 1993

[30] Foreign Application Priority Data

Nov. 12, 1992 [JP] Japan .................... 4-301958

[51] Int. Cl.⁶ .................................. G11B 17/028
[52] U.S. Cl. ........................... 369/270; 369/271
[58] Field of Search ................ 360/270, 99.12; 369/271, 282

[56] References Cited

U.S. PATENT DOCUMENTS

| | | | |
|---|---|---|---|
| 4,510,592 | 4/1985 | Kanamaru et al. | 360/99.12 |
| 4,541,086 | 9/1985 | Tanaka | 369/271 |
| 4,786,997 | 11/1988 | Funabashi et al. | 360/99.12 |
| 4,958,839 | 9/1990 | Guzik et al. | 369/271 |
| 5,303,098 | 4/1994 | Yamamori et al. | 360/99.12 |
| 5,323,379 | 6/1994 | Kim | 369/270 |

FOREIGN PATENT DOCUMENTS

| | | |
|---|---|---|
| 0247851 | 12/1985 | Japan ......... 369/270 |
| 61-236059 | 10/1986 | Japan . |
| 62-60162 | 3/1987 | Japan . |
| 62-112261 | 5/1987 | Japan . |
| 63-32329 | 3/1988 | Japan . |
| 63-183654 | 7/1988 | Japan . |

*Primary Examiner*—John H. Wolff
*Assistant Examiner*—William R. Korzuch
*Attorney, Agent, or Firm*—Wenderoth, Lind & Ponack

[57] ABSTRACT

In a clamp mechanism, an adapter, and an optical disc apparatus for compatibly playing back the MD and CD having different centering hole diameters and reference heights, a first clamp mechanism has a taper cone section for both an MD and a CD, while a second clamp mechanism has an MD turntable and a CD clamper which is driven in contact with the MD turntable while clamping the CD. The adapter is a disc which has a hole having the same inner diameter as that of the centering hole of the MD and a thickness of 0.8 mm, the adapter to be attached to the CD. A first optical disc apparatus has an MD spindle motor and a CD spindle motor, and an optical system including an objective lens is arranged on a straight line that connects both the spindle motors. A second optical disc apparatus has a spindle motor having an MD turntable and a CD turntable at both its ends.

12 Claims, 9 Drawing Sheets

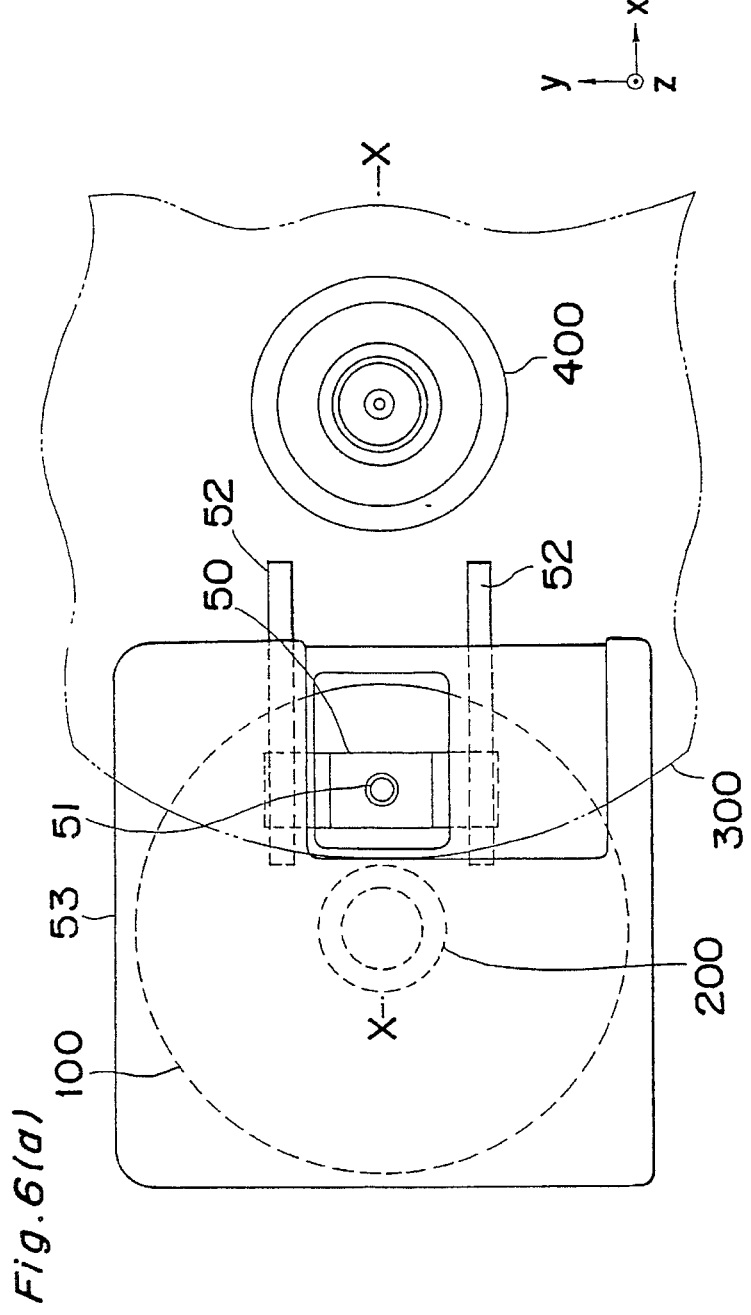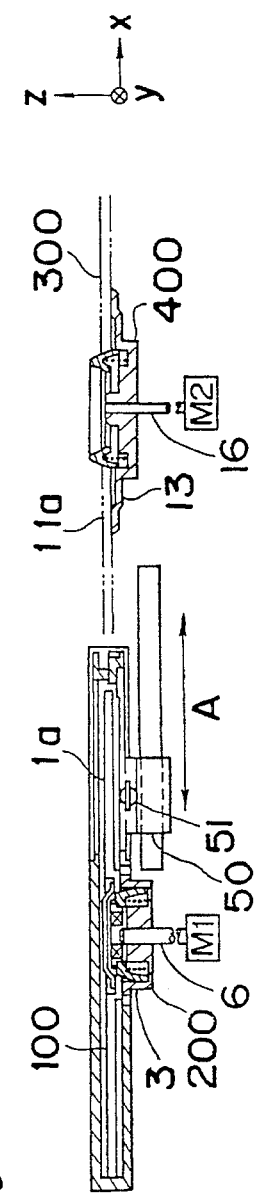

5,586,105

OPTICAL DISC CLAMP MECHANISM AND ADAPTER FOR USE IN AN OPTICAL DISC APPARATUS

BACKGROUND OF THE INVENTION

1. Field of the Invention

The present invention relates to an optical disc apparatus compatible with either of a mini disc (referred to as, "MD" hereinafter) and a compact disc (referred to as "CD" hereinafter) serving as data recording media for music, video, code data, and the like.

2. Description of the Prior Art

Conventionally, a CD has been popularly used as an optical disc data recording medium mainly for recording music data. In recent years, an MD has been developed as an optical disc data recording medium capable of easily recording data thereon.

The following describes MD and CD turntables of conventional MD and CD players with reference to the attached drawings.

FIGS. 8 (a), 8(b) and 8 (c) show a clamping operation of an MD turntable of a conventional MD player, while FIGS. 9 (a), 9 (b) and 9 (c) show a clamping operation of a CD turntable of a conventional CD player.

Reference is first made to an MD turntable in connection with FIGS. 8 (a) to 8 (c), where FIGS. 8 (a) and 8 (b) show a pre-clamping condition, while FIG. 8 (c) shows a post-clamping condition. In FIGS. 8 (a) to 8 (c), an MD 100 is composed of an approximately disc-shaped transparent substrate 1 having a thickness of 1.2 mm and a magnetic thin plate 2 which is rigidly adhered to the substrate 1. The substrate 1 has its upper surface serving as a data recording surface 1a and has its lower surface serving as a ring-shaped clamp area 1b which is vertically offset by 0.8 mm, with a centering hole 1c having a diameter of 11 mm formed at the center of the substrate 1. Although the MD 100 is normally received in a cartridge, such a cartridge is not shown herein.

Reference numeral 200 denotes an MD turntable for clamping the MD 100. Reference numeral 6 denotes a rotary shaft of a spindle motor (not shown) for generating a rotational torque. Reference numeral 3 denotes a flange-shaped disc receiving section to be put in contact with the clamp area 1b when the MD 100 is clamped. Reference numeral 4 denotes a taper cone section composed of a part of a sphere, which is fitted vertically and slidably in a recess 8 formed in the disc receiving section 3. Reference numeral 7 denotes a spring member for applying a biasing force to the taper cone section 4 to be biased upward. Reference numeral 5 denotes a magnet clamper which is composed of a torus-shaped magnet 5a and a yoke 5b. The magnet clamper 5 is rigidly fixed to a portion around the center of the disc receiving section 3 in a position closer to the MD 100. The torus-shaped magnet 5a has its upper portion magnetically oriented toward the north pole. The yoke 5b is made of a magnetic substance, which surrounds the magnet 5a except for the top surface of the magnet 5a facing the MD 100.

The following describes the operation of the conventional MD turntable having the above-mentioned construction.

When the MD 100 is moved closer to the MD turntable 200 from the condition shown in FIGS. 8 (a) and 8 (b), the magnet clamper 5 attracts the magnetic thin plate 2 of the MD 100 due to its magnetic force. The substrate 1 is put in contact with the taper cone section 4 at its inner peripheral edge of the centering hole 1c. In the above place, the magnetic force of the magnet 5a further attracts the MD 100 downward, and therefore a downward force is applied to the taper cone section 4. On the other hand, since the magnet clamper 5 is rigidly fixed to the disc receiving section 3 while the taper cone section 4 is vertically slidable with respect to the disc receiving section 3, the spring member 7 which is biasing upward the taper cone section 4 is elastically compressed to depress the taper cone section 4 downward. The downward movement of the taper cone section 4 continues until the clamp area 1b is put in contact with the disc receiving section 3, and thus the MD 100 is completely clamped as shown in FIG. 8 (c).

In the condition where the disc clamping is completed, the level of the data recording surface 1a is defined by the disc receiving section 3, while the position of the MD 100 in the direction of the plane of the disc is defined by the contact of the edge of the centering hole 1c with the taper cone section 4. The height of the data recording surface 1a from the surface of the disc receiving section 3 is 0.8+1.2=2.0 mm as shown in FIG. 8 (a).

Then reference is made to the CD turntable in connection with FIGS. 9 (a) to 9 (c), where FIGS. 9 (a) and 9 (b) show a pro-clamping condition, while FIG. 9 (c) shows a post-clamping condition. In FIGS. 9 (a) to 9 (c), reference numeral 300 denotes a CD which is composed of an approximately disc-shaped transparent substrate 11 having a thickness of 1.2 mm. The substrate 11 has its top surface serving as a data recording surface 11a. In the center position of the substrate 11, there is formed a centering hole 11c having a diameter of 15 mm.

Reference numeral 400 denotes a CD turntable for clamping the CD 300. Reference numeral 16 denotes a rotary shaft of a spindle motor (not shown) for generating a rotational torque. Reference numeral 13 denotes a flange-shaped disc receiving section to be put in contact with the lower surface of the CD 300 when the CD 300 is clamped, where the disc receiving section 13 has a recess 13a and a hub-like projection 13b formed therein. Reference numeral 14 denotes a taper cone section which is composed of a part of a sphere vertically and slidably fit in the recess 13a formed in the disc receiving section 13. Reference numeral 17 denotes a spring member for applying an upward biasing force to the taper cone section 14.

Reference numeral 18 denotes a disc pressing holder having a recess 18a formed in the center portion thereof. The disc holder 18 is loaded from a CD player and moved down onto the CD 300 so as to be rotatable around the motor shaft 16 when the CD 300 is clamped on the CD turntable 400.

The following describes the clamping operation of the CD turntable having the above-mentioned construction.

When the CD 300 is moved closer to the CD turntable 400 from the condition as shown in FIGS. 9 (a) and 9 (b), the substrate 11 is engaged in contact with the taper cone section 14 at the inner peripheral edge of the centering hole 11c. In the above place, the disc pressing holder 18 is moved down onto the CD 300 to depress the CD 300 downward. Therefore, a downward force is applied to the taper cone section 14. On the other hand, since the taper cone section 14 is vertically slidable in the recess 13a of the disc receiving section 13, the spring 17 biasing upward the taper cone section 14 is elastically compressed to depress the taper cone section 14 downward. When the disc pressing holder 18 is further moved downward, the hub-like projection 13b of the disc receiving section 13 is engaged with the recess 18a of the disc pressing holder 18, thereby centering the disc pressing holder 18 with respect to the motor shaft 16. The downward movement of the taper cone section 14 due to depression of the disc pressing holder 18 is continued until the CD 300 is put in contact with the disc receiving section 13, and thus the CD 300 is completely clamped as shown in FIG. 9 (c).

In the condition where the disc clamping is completed, the level of the data recording surface 11a is defined by the disc receiving section 13, while the position of the CD 300 in the direction of the plane of the disc is defined by the engagement of the taper cone section 14 put in contact with the centering hole 11c. The height of the data recording surface 11a from the surface of the disc receiving section 13 is approximately equal to the thickness of 1.2 mm of the substrate 11.

The aforementioned constructions, however, have the following problems.

Since the MD 100 and the CD 300 are subjected to a laser beam reflection type playback operation, it is technically easy to read data of either the MD and the CD by means of an identical single optical head. When either the MD and CD can be subjected To a playback operation by means of an identical disc apparatus, a great cost reduction and the like merits can be achieved.

However, the clamping means of the MD and CD significantly differ from each other as described above, and therefore no conventional single disc drive unit can compatibly play back the discs of MD and CD. For instance, the diameter of the centering hole 1c of the MD 100 is 11 mm, whereas the centering hole 11c of the CD 300 is 15 mm. The MD 100 is clamped by utilizing the magnetic force of the magnet clamper 5, whereas the CD 300 is held by utilizing an external application force of the disc pressing holder 18. Moreover, since the MD 100 is stored in a cartridge, it is impossible to externally hold to clamp the MD 100. Furthermore, as described for the conventional example, the height of the data recording surface 1a from the disc receiving section 3 of the MD is 2.0 mm, whereas the height of the data recording surface 11a from the disc receiving section 13 of the CD is 1.2 mm.

Therefore, it has been difficult for the conventional disc apparatus or clamping means to compatibly play back either of the MD and the CD by means of an identical disc drive unit because the clamping architectures of the discs are fundamentally different from each other. Therefore, in order to provide a hybrid audio apparatus such as a radio cassette player/recorder with the capability of compatibly playing back the MD and CD, special drive units are necessary for each of the discs. The above fact results in increasing the size and weight of the apparatus as well as increasing the cost.

SUMMARY OF THE INVENTION

Accordingly, the present invention has been made in order to solve the aforementioned problems, and an essential objective of the present invention is to provide an optical disc clamp mechanism, an adapter, and an optical disc apparatus capable of compatibly playing back either of an MD and a CD.

In order to achieve the aforementioned objective, a first optical disc clamp mechanism of the present invention comprises: an approximately circular disc receiving section which has at least an outer diameter being greater than the outer diameter of the centering hole of the CD and smaller than the outer diameter of the clamp area of the MD and which is to be put in contact with the reference surface of either of the MD and the CD; an approximately cone or spherical shaped first taper cone section for the MD, which is arranged peripherally inside the disc receiving section and elastically supported on the disc receiving section in the direction of a rotary shaft of a spindle motor as engaged with the centering hole of the MD; and an approximately cone or spherical shaped second taper cone section for the CD, which is elastically supported on the disc receiving section in the direction of the rotary shaft of the spindle motor as engaged with the centering hole of the CD. The first taper cone section for the MD and the second taper cone section for the CD are elastically depressed toward the spindle motor by the inner peripheral edge of the centering hole of the MD or the centering hole of the CD when the MD or the CD is loaded on the disc receiving section. The first taper cone section for the MD is arranged peripherally inside the second taper cone section for the CD and disposed substantially farther away from the spindle motor, while the second taper cone section for the CD is so arranged as to prevent it from interfering with the MD which is loaded on the disc receiving section.

An optical disc clamp mechanism is provided for use in an optical disc apparatus which executes at least playback of an MD and a CD compatibly. The optical disc clamp mechanism comprises a turntable for the MD provided at an end of a motor rotary shaft; and a CD clamper which is arranged approximately in parallel with the MD turntable so as to face the MD turntable at least in a condition that the CD clamper is rotatably supported around the rotary shaft separated therefrom. The CD clamper further includes centering means for centering the CD by engagement in contact with a centering hole of the CD, and coupling means for coupling the CD with the CD clamper by engagement in contact with the centering hole and either of both surfaces of the CD. A spacer section is provided and has a CD clamping area the level of which protrudes from the plane of the light-receiving surface of the CD coupled with the CD clamper by the coupling means to be put in contact with the surface of the disc receiving section of the MD turntable when the CD clamper is clamped on the MD turntable. CD clamper centering means is provided for centering the CD clamper with respect to the MD turntable as put in contact with the centering mechanism of the MD turntable. The spacer section is formed so that a distance from a CD clamp area to the data recording surface of the CD in the direction of the axis of the rotary shaft and a distance from the MD clamp area to the data recording surface of the MD in the direction of the axis of the rotary shaft are approximately equal to each other.

An adapter is provided for use in an optical disc apparatus for at least playing back an MD and a CD compatibly. The optical disc apparatus has an MD turntable provided at an end of a motor rotary shaft. The adapter comprises a clamp mechanism approximately the same as the clamp mechanism of the MD, a centering means for centering the CD with the adapter by engagement in contact with a centering hole of the CD, and coupling means for coupling the CD with the adapter by engagement in contact with at least one of the centering hole and both surfaces of the CD. A spacer section protrudes from the plane of the light-receiving surface of the CD coupled with the adapter by the coupling means and which includes a CD clamping area to be put in contact with the disc receiving surface of the MD turntable when clamped on the MD turntable. Adapter centering means is provided for centering the adapter with respect to the MD turntable as put in contact with the centering mechanism of the MD turntable. The spacer section is formed so that a distance from an adapter clamp area to the data recording surface of the CD in the direction of the axis of the rotary shaft and a distance from the MD clamp area to the data recording surface of the MD in the direction of the axis of the rotary shaft are approximately equal to each other.

An optical disc apparatus comprises an optical head having at least an objective lens for executing at least playback of an MD and a CD by applying a laser beam onto each of the discs, an MD turntable having an MD disc receiving section, which is operatively coupled to an MD rotary shaft. A CD turntable is provided and has a CD receiving section, which is operatively coupled to a CD rotary shaft arranged approximately in parallel with the MD rotary shaft. The objective lens is arranged in a position on a straight line that connects the MD rotary shaft and the CD rotary shaft, and the level of the MD disc receiving section is advanced by a distance of 0.8 mm below the level of the CD receiving section. The MD turntable is arranged in a position where the MD turntable does not interfere with the CD loaded on the CD turntable, so that the objective lens cpmpatibly accesses either of the MD and CD in the radial direction of each disc.

An optical disc apparatus comprises a base means, a single optical head which has at least an objective lens for executing at least playback of an MD and a CD by applying a laser beam onto each of the discs to access in a radial direction of each disc, and a spindle motor provided with an MD turntable at one end of its rotary shaft and a CD turntable at the other end of its rotary shaft. The spindle motor has a function of forwardly and reversely rotating its rotary shaft. A pivot mechanism is provided and has a pivot shaft extending approximately perpendicular to the rotary shaft of the spindle motor to support the spindle motor pivotally around the pivot shaft with respect to the base as mounted in a position between the spindle motor and the base. Pivot support means supports a pivotal movement of the spindle motor around the pivot shaft in either a first condition where the rotary shaft of the spindle motor is approximately in parallel with a direction of the laser beam from the objective lens and a direction directed from the spindle motor to the MD turntable is approximately equal to the direction of the laser beam, or a second condition where the rotary shaft of the spindle motor is approximately in parallel with the direction of the laser beam from the objective lens and a direction directed from the spindle motor to the CD turntable is approximately equal to the direction of the laser beam. The pivot shaft is arranged in position so that the distance from the objective lens to the data recording surface of the MD in a condition where the MD is loaded on the MD turntable in the first condition is approximately equal to the distance from the objective lens to the data recording surface of the CD in a condition where the CD is loaded on the CD turntable in the second condition.

According to a feature of the first optical disc clamp mechanism of the present invention, the first and second taper cone sections independently effect the centering of the MD and CD having different centering hole diameters to allow either of the MD and the CD to be centered compatibly.

According to a feature of the second optical disc clamp mechanism of the present invention, the CD clamper having the CD clamped thereon can be clamped on the MD turntable. Furthermore, the data recording surface of either of the MD and the CD can be put at an equal distance from the surface of the disc receiving section.

According to a feature of the adapter of the present invention, the adapter having the CD clamped thereon can be clamped on the MD turntable to allow the optical disc apparatus to have no special construction for the CD. Furthermore, the data recording surface of either the MD and the CD can be put at an equal distance from the surface of the disc receiving section.

According to the first optical disc apparatus of the present invention having the aforementioned construction, the objective lens can access either of the MD and the CD in the radial direction of each disc, and the data recording surface of each of the MD and the CD can be put at an equal distance from the objective lens, which allows either of the discs to be played back utterly in the same condition.

According to the second optical disc apparatus of the present invention having the aforementioned construction, the MD and CD can be driven by one spindle motor, and the data recording surface of either the MD and the CD can be treated equally in view of the objective lens.

As described above, the present invention can provide an optical disc clamp mechanism, and an adapter for use in an optical disc apparatus allowing play back of either of the MD and the CD by means of a single optical head and single drive unit. This provides a number of advantages such as cost reduction, space savings, and the like.

BRIEF DESCRIPTION OF THE DRAWINGS

These and other objects and features of the present invention will become apparent from the following description taken in conjunction with the preferred embodiment thereof with reference to the accompanying drawings, in which:

FIG. 1 (b) is a sectional view for explaining the operation of the clamp mechanism of the first embodiment when clamping an MD;

FIG. 1 (c) is a sectional view for explaining the operation of the clamp mechanism of the first embodiment when clamping a CD;

FIG. 5 (b) is a sectional view for explaining the operation of the adapter of the third embodiment having a CD attached thereto;

FIG. 5 (c) is a sectional view for explaining the operation of the adapter of FIG. 5 (b) when clamped to an MD turntable;

FIG. 6 (a) is a plan view of an optical disc apparatus in accordance with a fourth embodiment of the present invention;

FIG. 6 (b) is a side sectional view of the optical disc apparatus of the fourth embodiment;

DETAILED DESCRIPTION OF THE PREFERRED EMBODIMENTS

Figure 1A:
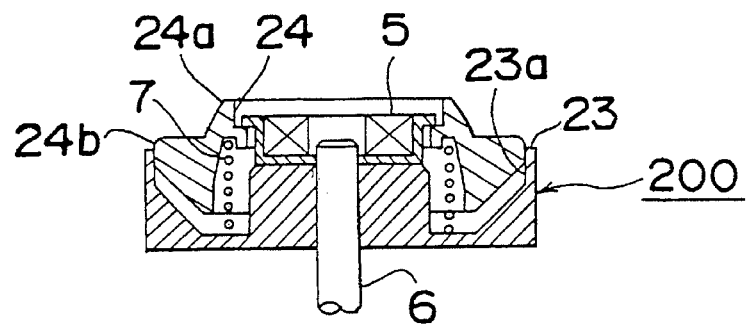
FIG. 1 (a) is a sectional view of a clamp mechanism in accordance with a first embodiment of the present invention.

Before the description proceeds, it is to be noted that, since the basic structures of the present embodiments are similar to those of the conventional ones, like parts are designated by the same reference numerals throughout the drawings and the redundant explanation thereof is omitted here.

First Embodiment

The following describes an optical disc clamp mechanism in accordance with a first embodiment of the present invention with reference to the attached drawings.

Figure 1B:
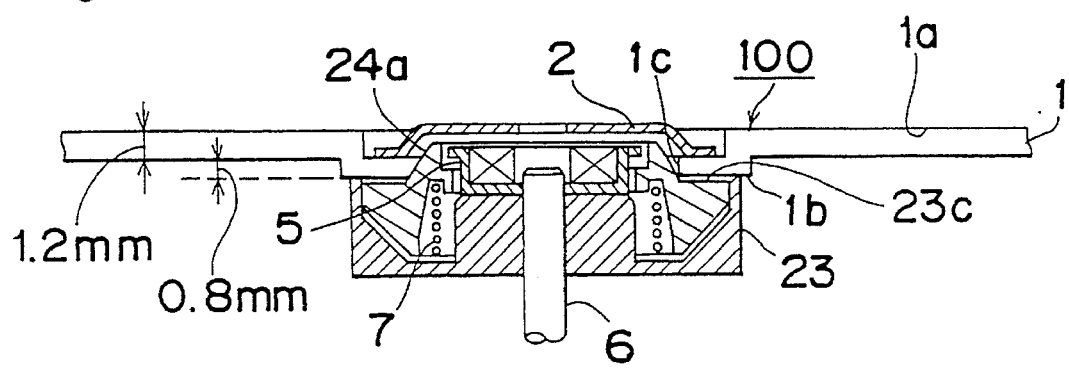
Figure 1C:
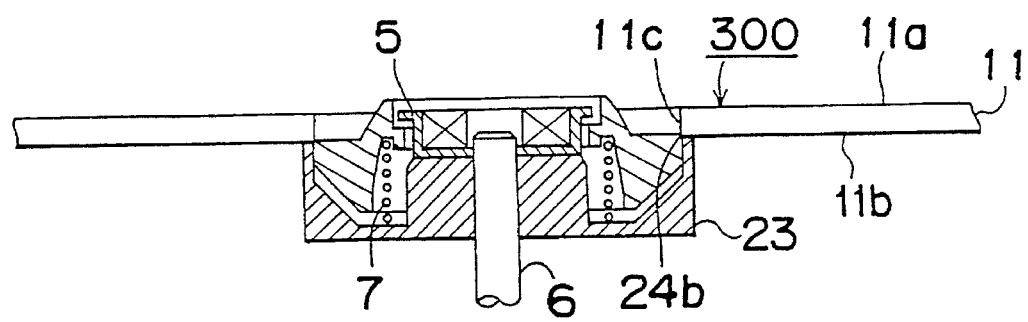

FIGS. 1 (a) through 1 (c) show an optical disc clamp mechanism in accordance with the first embodiment of the present invention, where FIG. 1 (a) shows a condition where no disc is loaded, FIG. 1 (b) shows a condition where an MD is loaded, and FIG. 1 (c) shows a condition where a CD is loaded.

In FIGS. 1 (a) through i (c), a magnet clamper 5, a rotary shaft 6 of a spindle motor (not shown), and a spring 7 are the same as those of the conventional example. Reference numeral 23 denotes a disc receiving section which has the same function as those of the disc receiving sections 3 and 13 in the conventional example. Reference numeral 24 denotes a taper cone section including a first taper cone 24a positioned at the inner peripheral side and a second taper cone 24b positioned at the outer peripheral side. The first taper cone 24a is protruded from the second taper cone 24b. The taper cone section 24 is fit in a recess 23a of the disc receiving section 23 so as to be slidable in a direction in parallel with the rotary shaft 6. The spring 7 applies a biasing force for biasing the taper cone section 24 upward. The magnet clamper 5 is secured at an upper portion around the center of the disc receiving section 23 in the same manner as in the conventional example. In FIGS. 1 (b) and 1 (c), the MD 100 and the CD 300 are the same as those of the conventional example.

The following describes the operation of the optical disc clamp mechanism having the above-mentioned construction.

First, reference is made to a case where the MD 100 is clamped in connection with FIG. 1 (b).

When the MD 100 is moved closer to the disc receiving section 23, the magnet clamper 5 attracts a thin plate shaped magnetic member 2 of the MD 100 due to its magnetic force. The substrate 1 is put in contact with the first taper cone 24a of the taper cone section 24 at the inner peripheral edge of the centering hole 1c while being not in contact with the other portion of the taper cone section 24. Subsequently, the taper cone section 24 is depressed downward against the biasing force of the spring 7 until the clamp area 1b is put in contact with the top edge of the disc receiving section 23 in the same manner as in the conventional example, and consequently the MD 100 is completely clamped on the turntable 200 as shown in FIG. 1 (b).

Figure 8A:
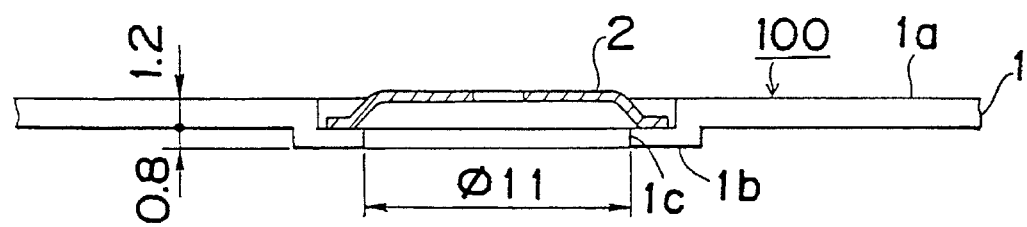
FIGS. 8 (a), 8 (b) and 8 (c) are sectional views for explaining a clamping operation of a conventional MD turntable.
Figure 8B:
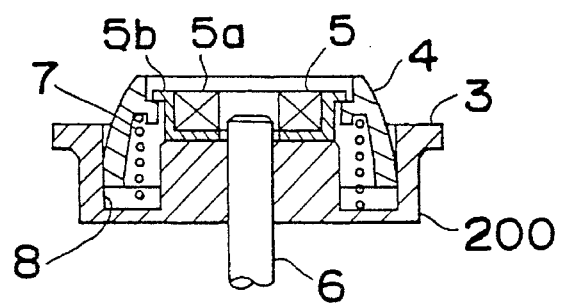
Figure 8C:
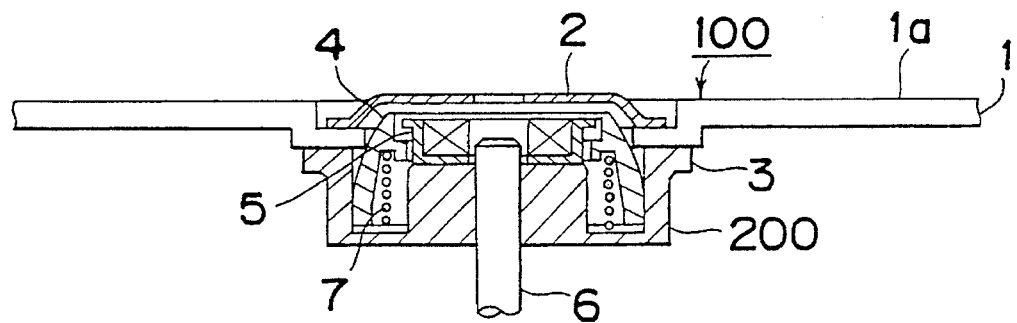

In the condition that the clamping of the MD 100 is completed, the level of the data recording surface 1a is defined by the disc receiving section 23, and the position of the MD 100 in the direction of the plane of the disc is defined by the first taper cone 24a of the taper cone section 24 engaged in contact with the inner peripheral edge of the centering hole 1c. In this condition, only the first taper cone 24a of the taper cone section 24 is put in contact with the centering hole 1c of the MD 100, and the other portion of the taper cone section 24 is not put in contact with the MD 100. In more detail, when the MD is attached to the disc receiving section 23, the second taper cone 24b is prevented from contacting with the MD by defining a clearance 23c. The height of the data recording surface 1a from the disc receiving section 23 is 0.8+1.2=2.0 mm in the same manner as in the conventional example as shown in FIGS. 8 (a) and 8 (b).

Then, the following describes the operation in he case where the CD 300 is clamped with reference to FIG. 1 (c).

When the CD 300 is moved closer to the disc receiving section 23, the substrate 11 is put in contact with the second taper cone 24b of the taper cone section 24 at the inner peripheral edge of the centering hole 11c, while the substrate 11 is not put in contact with the other portion of the taper cone section 24. At this moment, the disc pressing holder (not shown), which is the same as the conventional disc holder 18, moves down onto the CD 300 to depress the CD 300 downward. Subsequently, the taper cone section 24 is further depressed downward until the CD 300 is put in contact with the disc receiving section 23 in the same manner as in the conventional example, and consequently the CD 300 is completely clamped as shown in FIG. 1 (c).

Figure 9A:
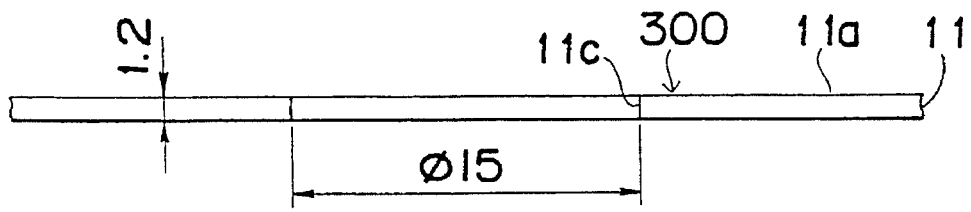
FIGS. 9 (a), 9 (b) and 9 (c) are sectional views for explaining a clamping operation of a conventional CD turntable.
Figure 9B:
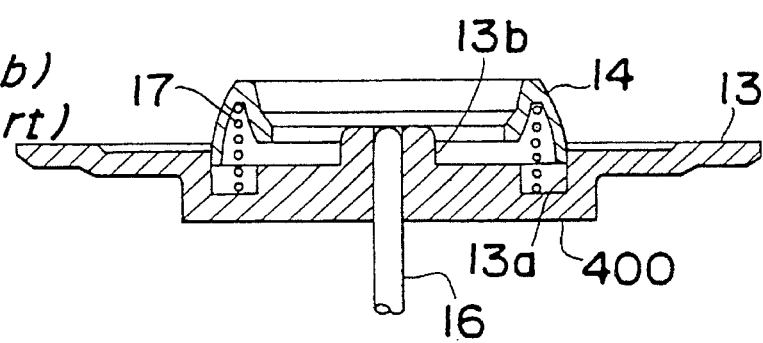
Figure 9C:
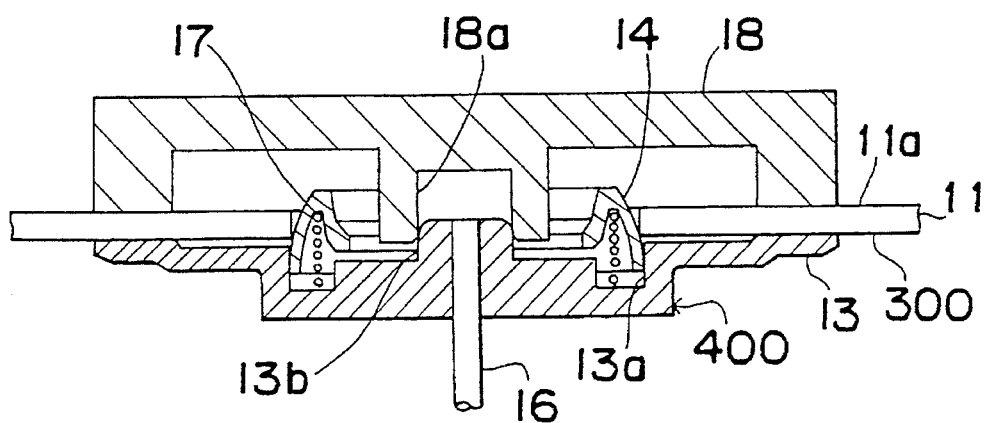

In the condition where the clamping of the CD is completed, the level of the data recording surface 11a is defined by the disc receiving section 23, while the position of the CD 300 in the direction of the plane of the disc is defined by the contact of the second taper cone 24b of the taper cone section 24 with the peripheral edge of the centering hole 11c. In this condition, only the second taper cone 24b is put in contact with the centering hole 11c of the CD 300, and the other portion of the taper cone section 24 is not put in contact with the CD 300. The height of the data recording surface 11a from the disc receiving section 23 is 1.2 mm in the same arrangement as in the conventional example as shown in FIGS. 9 (a) and 9 (b).

According to the present embodiment as described above, by providing the first taper cone 24a which is to be put in contact only with the MD 100 and the second taper cone 24b which is to be put in contact only with the CD 300, the first and second taper cones 24a and 24b independently effect the cantering of the MD 100 and the CD 300 respectively having different centering hole diameters to allow either of the discs to be centered. Furthermore, by providing the magnet clamper 5 for the MD 100, the construction of magnetically clamping the MD 100 and the construction of externally pressing and holding the CD 300 can be compatibly achieved.

Second Embodiment

The following describes an optical disc clamp mechanism in accordance with a second embodiment of the present invention with reference to the attached drawings.

The purpose of the present embodiment is to achieve an optical disc clamp mechanism (or adapter) where either of the MD and the CD can be compatibly clamped and the distance from the disc receiving section to the data recording surface of each disc is identical.

Figure 2:
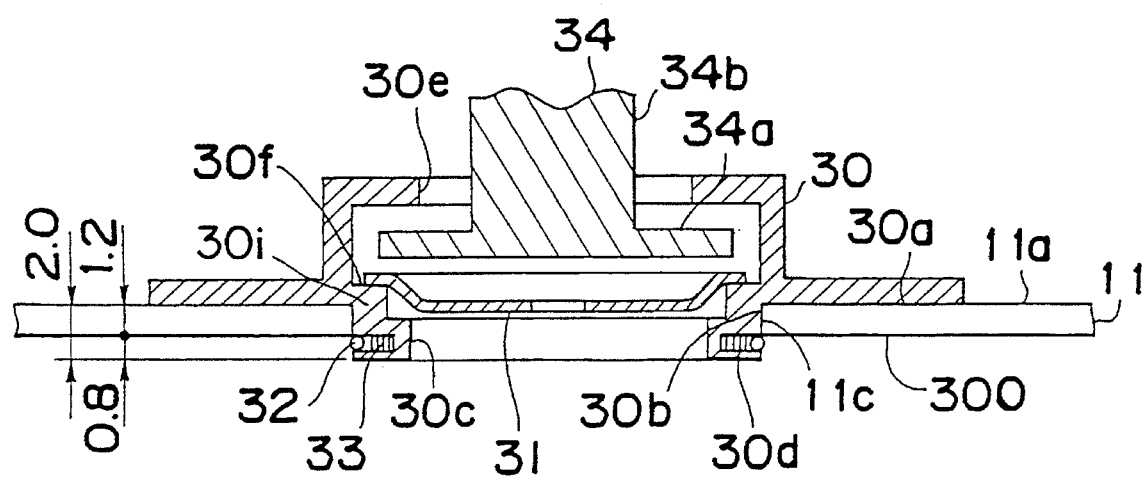
FIG. 2 is a sectional view of a clamp mechanism in accordance with a second embodiment of the present invention.
Figure 3:
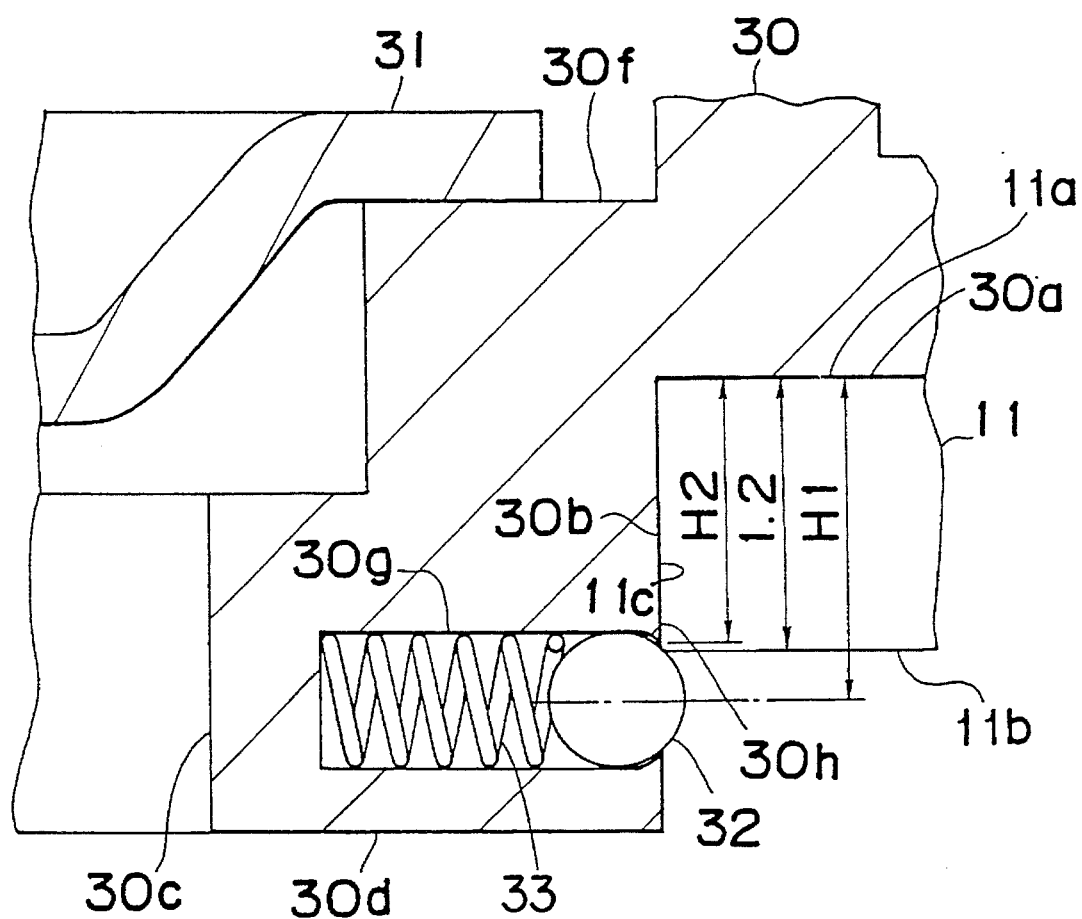
FIG. 3 is a partially-enlarged sectional view of the clamp mechanism of the second embodiment of the present invention.
Figure 4:
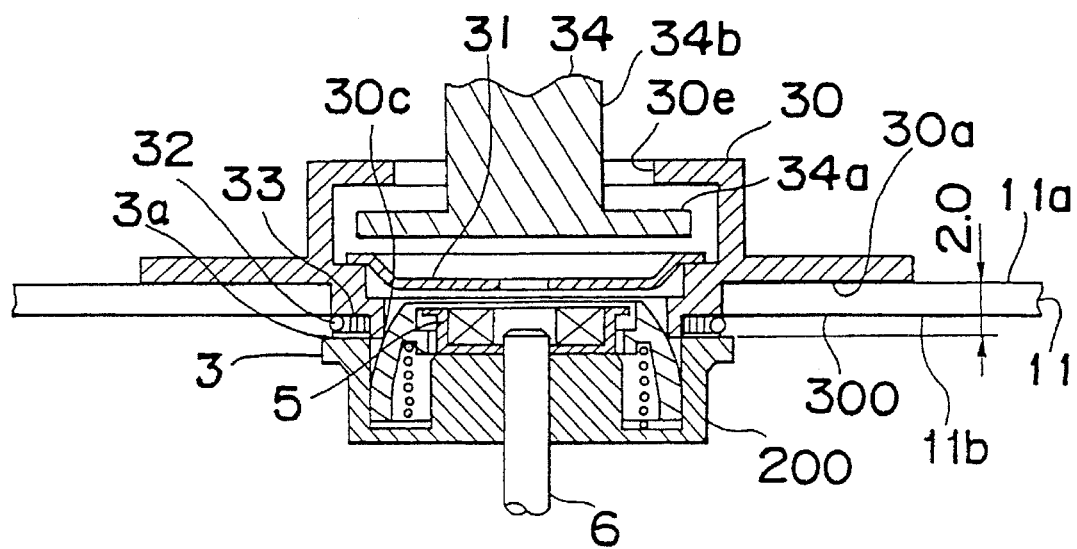
FIG. 4 is a sectional view for explaining the operation of the clamp mechanism of the second embodiment when clamping a CD.

FIGS. 2 through 4 show an optical disc clamp mechanism in accordance with the second embodiment of the present invention, where FIG. 2 shows a condition when a CD is loaded, FIG. 3 shows the detail of a portion of the clamp mechanism, and FIG. 4 shows a condition when the clamp mechanism is loaded on an MD turntable.

In FIGS. 2 through 4, the CD 300 and the MD turntable 200 are the same as those in the conventional example. Reference numeral 31 denotes a thin plate shaped magnetic member which has a slightly different mechanism configuration from that of the conventional example, however, it has the same magnetic property.

Reference numeral 30 denotes a CD clamper having a disc-shaped (annular) CD receiving surface 30a for receiving the data recording surface 11a of the CD 300 and a hollow cylindrical spacer section 30i which protrudes downward from the CD receiving surface S0a by 2.0 mm. The spacer section 30i is provided with a cylindrical section CD centering 30b having its outer diameter slightly smaller than that of the centering hole 11c of the CD 300. A hole opening 30c is formed at the center of the CD centering section 30b, where the hole diameter is the same as that of the centering hole 1c of the MD 100 (i.e., 11 mm). Reference numeral 30d denotes an annular contact surface to be put in contact with the disc receiving section 3 of the MD turntable 200, the contact surface being provided at the bottom end of the CD centering section 30b. Reference numeral 30f denotes an annular magnetic member fixation surface to which the magnetic member 31 is rigidly fixed.

As shown in FIG. 3, on the peripheral side surface of the CD centering section 30b are formed four steel ball housings 30g arranged at regular angular intervals of 90°. A distance H1 from the CD receiving surface 30a to the center axis of each steel ball housing 30g is designed to be greater than 1.2 mm (i.e., thickness of the substrate 11). In each steel ball housing 30g, a spring 33 for the steel ball and a steel ball (or optical disc coupling element) 32 in this order are inserted. The steel ball 32 has an outer diameter which is slightly smaller and approximately equal to the inner diameter of the steel ball housing 30g to be slidable with respect to the inner surface of the steel ball housing 30g.

The spring 33 for the steel ball biases the steel ball 32 toward the external surface of the CD centering section 30b. However, a pawl section 30h having an inner diameter smaller than the outer diameter of the steel ball 32 is formed at the peripheral portion of the outlet of the steel ball housing 30g in the vicinity of the external surface of the CD centering section 30b. Therefore, the steel ball 32 is prevented from dropping out of the steel ball housing 30g, but a part of the steel ball 32 protrudes from the external surface of the CD centering section 30b due to the inner diameter of the pawl section 30h. As shown in FIG. 3, a distance H2 between the CD receiving surface 30a and the curved tip end of the pawl section 30h is designed to be slightly smaller than the thickness 1.2 mm of the substrate 11.

As shown in FIGS. 2 to 4, reference numeral 34 denotes a support member supported on a vertical movement mechanism (not shown) of the disc apparatus. The support member 34 has an inverted T-shaped cross-sectional configuration composed of a disc section 34a at the bottom end and a cylindrical section 34b which extends from the vertical movement mechanism of the disc apparatus and is integrally connected to the disc section 34a. The CD clamper 30 has a construction such that it encloses the disc section 34a with a clearance therebetween for allowing both the members to be kept out of contact with each other. Reference numeral 30e denotes a clearance hole through which the cylindrical section 34b of the support member 34 extends 20 as to be kept apart from the CD clamper 30 by a specified distance. The clearance hole has a hole diameter smaller than the outer diameter of the disc section 34a and greater than the outer diameter of the cylindrical section 34b. Therefore, the CD clamper 30 does not fall off the support member 34.

The following describes the operation of the optical disc clamp mechanism having the above-mentioned construction.

First, the CD 300 is made to approach the CD clamper 30 from below in such a manner that the data recording surface 11a face the CD receiving surface 30a and the CD centering section 30b of the CD clamper 30 is inserted into the centering hole 11c of the CD 300. The steel ball 32 protrudes from the external surface of the CD centering section 30b; however, since the steel ball 32 is slidable in the steel ball housing 30g, the steel ball 32 is pushed by the peripheral edge of the centering hole 11c when a sufficient force for inserting the CD 300 is applied. Then the spring 33 biasing for the steel ball is elastically compressed by a horizontal component of the applied force to move the steel ball 32 deep into the steel ball housing 30g, so that the steel ball 32 is retracted from the CD centering section 30b to allow the CD 300 to be continuously inserted.

When the disc insertion is continued, since the distance H1 from the center axis of the steel ball housing to the CD receiving surface 30a is greater than 1.2 mm and the substrate 11 has a thickness of 1.2 mm as shown in FIG. 3, the steel ball 32 protrudes again from the external surface of the CD centering section 30b before the data recording surface 11a reaches the CD receiving surface 30a.

In the condition where the CD 300 is completely loaded on the CD clamper 30, the data recording surface 11a is in contact with the CD receiving surface 30a as shown in FIGS. 2 and 3. Since the distance H2 from the CD receiving surface 30a to the curved end of the pawl section 30h is designed to be slightly smaller than 1.2 mm, the steel ball 32 does not contact with the pawl section 30h but rather contacts with the lower peripheral edge of the centering hole 11c as shown in FIG. 3 in this condition. In more detail, the biasing force of the spring 33 acts on the CD 300 by way of the steel ball 32 to push the data recording surface 11a against the CD receiving surface 30a to thereby constitute a coupling means to couple the CD to the CD clamper 30 and determine the position and effect the centering of the disc, due to the balance provided by the four springs 33 for four steel balls.

When the vertical movement mechanism of the disc apparatus moves down to make the support member 34 approach the MD turntable 200, the CD clamper 30, which has completed the clamping of the CD 300 and is connected slidably to the support member 34, approaches the MD turntable 200 as shown in FIG. 4. The CD clamper 30 has the magnetic member 31 fixed thereto in the same manner as the magnetic member 2 provided for the MD 100, and has a centering hole 30c formed therein with its diameter the same as that of the centering hole 1c of the MD 100. Therefore, the magnetic member 31 is attracted to the magnet clamper 5 due to its magnetic force in the same manner as in the conventional example. Then the centering hole 30c is centered by the taper cone section 4, and the surface 30d is put in contact with the disc receiving section 3 to completely clamp the CD 300 to the MD turntable 200.

In the, condition where the clamping is completed, the height of the data recording surface 11a is defined by the disc receiving section 3 and the distance from the contact surface 30d to the CD receiving surface 30a. The position of the CD 300 in the direction of the plane of the disc is regulated by the contact of the centering hole 30c with the taper cone section 4, and by the contact between the steel ball 32 and the centering hole 11c. In the above condition, the support member 34 is not in contact with the CD clamper 30.

The distance from the disc receiving section 3 to the data recording surface 11a is 2.0 mm which is approximately equal to the distance from the surface 30d to the CD receiving surface 30a. The above value of distance is equal to the distance 2.0 mm from the disc receiving section 3 to the data recording surface 1a of the MD 100 as in the description for the conventional example shown in FIGS. 8 (a) and 8 (b).

The operation of clamping the MD 100 onto the MD turntable 200 is performed in the same manner as that in the conventional example, and therefore no description is provided therefor.

According to the present embodiment as described above, the CD clamper 30 having the CD 300 clamped therewith can be clamped on the MD turntable 200 by providing a clamp mechanism including the same magnet clamp 31 as that of the MD 100, where the CD clamper 30 is provided with the CD receiving surface 30a for receiving the data recording surface 11a of a CD, the contact surface 30d to be put in contact with the disc receiving section 3 of the MD turntable 200, the spring 33 and the steel ball 32 (which constitute a coupling means) for centering the CD 300 and coupling the CD 300 to the CD clamper 30 by pressing the CD against the CD receiving surface 30a, and where the distance from the contact surface 30d to the CD receiving surface 30a is made 2.0 mm equal to the distance from the clamp area 1b of the MD 100 to the data recording surface 1a. Furthermore, the data recording surface 1a of the MD 100 and the data recording surface 11a of the CD 300 are put at an equal distance from the disc receiving section 3. Therefore, the data recording surface 1a and the data recording surface 11a are put at an equal distance from the optical head to allow for the reading of data from either of the MD and the CD by a single optical head without any technical problem.

Although four steel ball housings 30g each for storing a steel ball 32 and spring 33 are employed and arranged at regular angular intervals of 90° in the present embodiment, it is also permitted to use any number of steel ball housings 30g for the springs and steel balls provided that not fewer than three steel ball housings are arranged at approximately regular angular intervals.

Although the elastic restoration force of the spring 33 for the steel ball is used to press the CD 300 against the CD receiving surface 30a to effect the centering of the CD in the present embodiment, any other method may be adopted as the centering means instead of providing steel ball housings.

Third Embodiment

The following describes an adapter in accordance with a third embodiment of the present invention with reference to the attached drawings.

The purpose of the present embodiment is to achieve an adapter to be attached to a CD, allowing the CD to be loaded on the MD turntable while ensuring an identical distance from the disc receiving section to the data recording surface of each disc.

Figure 5A:
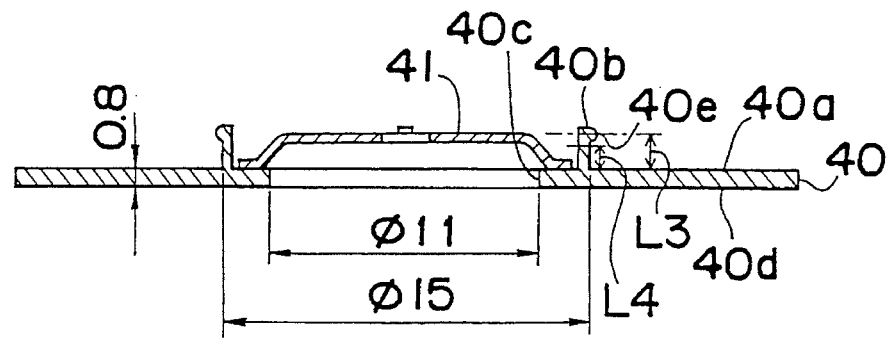
FIG. 5 (a) is a sectional view of an adapter in accordance with a third embodiment of the present invention.
Figure 5B:
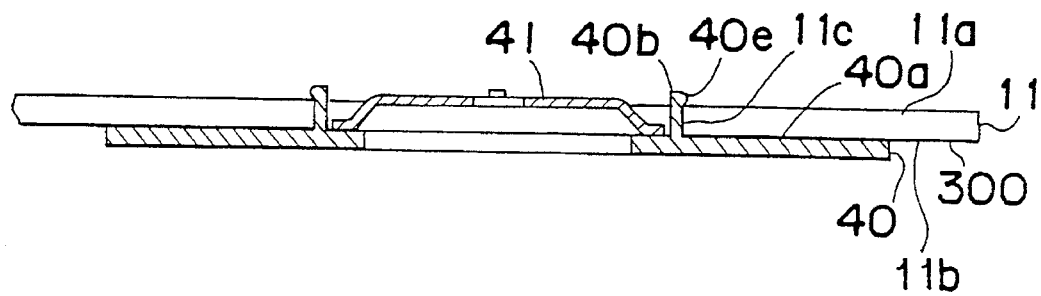
Figure 5C:
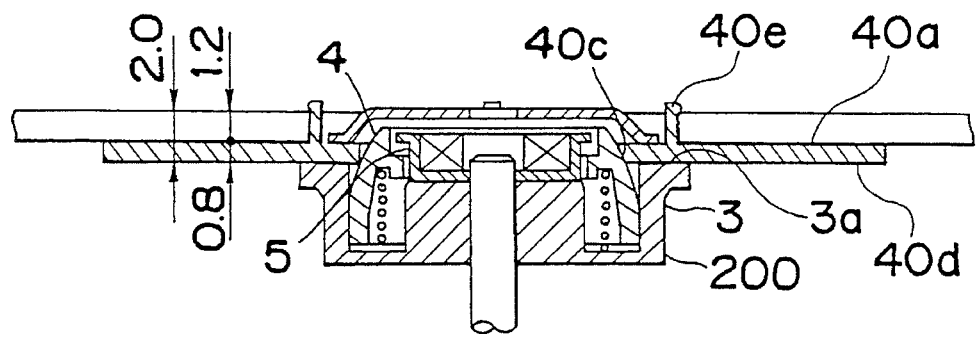

FIGS. 5 (a) through 5 (c) show an adapter in accordance with the third embodiment of the present invention, where FIG. 5 (a) shows the adapter, FIG. 5 (b) shows a condition having a CD attached on the adapter, and FIG. 5 (c) shows a condition of the adapter with the CD loaded on the MD turntable.

In FIG. 5 (a) through 5 (c), the CD 300 and the MD turntable 200 are the same as those of the conventional example. Reference numeral 41 denotes a magnetic member substantially the same as the magnetic member 2 in the conventional example. Reference numeral 40 denotes an approximately disc-shaped adapter which has a thickness of 0.8 mm and is made of, for example, resin. The adapter 40 has a CD receiving surface 40a at its upper portion to which the light-receiving surface 11b of the CD 300 is attached as shown in FIGS. 5 (a) and 5 (b). The other surface 40d opposite from the CD receiving surface 40a is to be put in contact with the disc receiving section 3 of the MD turntable 200. At the center of the adapter 40, a centering hole 40c is formed having the same diameter of 11 mm as that of the centering hole 1c of the MD 100.

On the CD receiving surface 40a, there are integrally molded four square-pole-shaped elastic projections 40b which are approximately vertically extended and arranged at regular angular intervals of 90° concentrically with the centering hole 40c. The elastic projections 40b can be elastically deformed in a direction in parallel with the CD receiving surface 40a. The outer diameter of the intersections of the elastic projections 40b and the CD receiving surface 40a is 15 mm which is the same as that of the centering hole 11c of the CD 300. Furthermore, at around the upper end portion of each of the elastic projections 40b is provided a semi-cylindrical pawl section 40e projecting outward. The distance L3 from the center axis of the semi-cylindrical pawl section 40e to the CD receiving surface 40a is made slightly greater than 1.2 mm. The distance L4 from the intersection of the lower end of the pawl section 40e and the elastic projection 40b to the CD receiving surface 40a is set slightly smaller than 1.2 mm (i.e., L3>1.2 mm>L4). The magnetic member 41 is fixed to the upper peripheral portion of the centering hole 40c on the CD receiving surface 40a.

The following describes the operation of the adapter having the above-mentioned construction.

First, the elastic projections 40b are inserted into the centering hole 11c in such a manner that the CD receiving surface 40a faces the light-receiving surface 11b of the CD 300 as shown in FIG. 5 (b). In this procedure, since the outer diameter of the top end of the pawl section 40e formed at an upper end portion of each elastic projection 40b is slightly greater than the diameter of the centering hole 11c, the elastic projections 40b are elastically deformed inward when the projections are inserted. When the projections are inserted until the light-receiving surface of the CD 300 is put in contact with the CD receiving surface 40a, the adapter 40 is completely attached to the CD 300. In this state, the level of the center axis of the pawl section 40e is located above the level of the data recording surface 11a of the CD 300, and the level of the intersection of the pawl section 40e and each of the elastic projections 40b is positioned below the data recording surface 11a. In other words, the contact angle of the pawl section 40e with respect to the upper peripheral edge of the centering hole 11c is directed below the level, and the elastic projections 40b are kept in a deformed condition. Each of the elastic projections 40b having an elastic restoration force applies an elastic restoration force to the centering hole 11c. Therefore, the elastic projections 40b press the CD 300 downwardly against the CD receiving surface 40a by the operation of the pawl sections 40e. Thus, the adapter 40 and the CD 300 are rigidly secured.

Then the adapter 40 is moved closer to the MD turntable 200 as shown in FIG. 5 (c). The adapter 40 has the magnetic member 41 fixed thereto having the same construction as that of the magnetic member 2 of the MD 100 and has the centering hole 40c formed therein having the same diameter as that of the centering hole 1c of the MD 100. Therefore, the magnetic member 41 is attracted to the magnet clamper 5 due to its magnetic force in the same manner as in the conventional example, and the centering hole 40c is centered by the taper cone section 4. Thus, the lower contact surface 40d is put in contact with the upper surface 3a of the disc receiving section 3 to completely clamp the CD 300 on the MD turntable 200.

In the condition where the clamping is completed, the height of the data recording surface 11a is defined by the distance from the contact surface 40a contacted with the disc receiving section 3 to the CD receiving surface 40a. The position of the CD 300 in the direction of the plane of the disc is defined by the contact of the centering hole 40c with the taper cone section 4, and by the contact of the pawl section 40e with the centering hole 11c by the elastic restoration force of the elastic projections 40b.

The distance from the upper surface 3a of the disc receiving section 3 to the data recording surface 11a is approximately equal to the sum of the distance of 0.8 mm from the contact surface 40d to the CD receiving surface 40a and the thickness 1.2 mm of the substrate 11, the sum being 2.0 mm. The above value is equal to the distance of 2.0 mm from the disc receiving section 3 to the data recording surface 1a of the MD 100 as in the description of the conventional example shown in FIGS. 8 (a) and 8 (b).

The operation of clamping the MD 100 on the MD turntable 200 is performed in the same manner as in the conventional example, and therefore no description therefor is provided herein.

Although the present embodiment has substantially the same effect as that of the second embodiment, the present embodiment requires no such means as the CD clamper 30 in the disc apparatus. Therefore the present embodiment has the great effect of allowing the CD to be clamped only by using the MD turntable 200.

According to the present embodiment as described above, the adapter 40 having a clamp mechanism including the same magnet clamp as that of the MD 100 is provided with the CD receiving surface 40a for receiving the light-receiving surface 11b of the CD, the surface 40d to be put in contact with the disc receiving section 3 of the MD turntable 200, and the elastic projections 40b each having the pawl section 40e at their tip end portions for centering the CD 300 and pressing the CD against the CD receiving surface 40a, where the distance from the surface 40d to the CD receiving surface 40a is made 0.8 mm. Thus, the adapter 40 having the CD 300 attached thereto can be clamped on the MD turntable 200. Furthermore, the distance from the data recording surface 11a of the CD 300 to the upper surface 3a of the disc receiving section 3 is equal to the sum of the thickness 0.8 mm of the adapter and the thickness 1.2 mm of the substrate 11, i.e., the sum 2.0 mm which is equal to the distance from the data recording surface 1a of the MD 100 to the disc receiving surface 3a. Therefore, the data recording surface 1a and the data recording surface 11a are put at an equal distance viewing from the optical head to allow either of the discs of MD and CD to be read by using a single optical head without any technical problem.

Although four elastic projections 40b each having a pawl section 40e are arranged at regular angular intervals of 90° in the present embodiment, it is also permitted to use any number of the elastic projections 40b provided that at least three elastic projections 40b are arranged at approximately regular angular intervals.

Although the elastic restoration force of the elastic projections 40b each provided with the pawl section 40e is used for pressing the CD 300 against the CD receiving surface 40a to center the CD in the present embodiment, any other centering method may be adopted.

Fourth Embodiment

The following describes an optical disc apparatus in accordance with a fourth embodiment of the present invention with reference to the attached drawings.

The purpose of the present embodiment is to achieve an optical disc apparatus which can at least play back the CD and the MD compatibly with use of a single drive unit.

FIGS. 6 (a) and 6 (b) show an optical disc apparatus in accordance with the fourth embodiment of the present invention, where FIG. 6 (a) shows a plan view, and FIG. 6 (b) shows a sectional view of the optical disc apparatus. In each of FIGS. 6 (a) and 6 (b), right-hand rectangular coordinate systems are defined as illustrated in the figures.

It is to be noted that the MD 100, MD turntable 200, CD 300, and CD turntable 400 are the same as those of the conventional examples. Regarding the MD turntable 200 and the CD turntable 400, the disc receiving section 3 of the MD turntable 200 is displaced by 0.8 mm from the disc receiving section 13 of the CD turntable 400 negatively in the z-axis direction. The MD turntable 200 is set sufficiently apart from the CD turntable 400 in the x-axis direction by such a distance that the CD 300 does not interfere with the MD turntable 200 when the CD 300 is loaded on the CD turntable 400. An MD spindle motor (M1) is provided with an MD turntable having an MD disc receiving section at an end of its rotary shaft; and a CD spindle motor (M2) is arranged so that its rotary shaft is approximately in parallel with the rotary shaft of the MD spindle motor and provided with a CD turntable having a CD receiving section at the rotary shaft end at which the MD turntable is provided.

It is assumed that the line X—X is a straight line in parallel with the x-axis that connects the center of the MD turntable 200 and the center of the CD turntable 400. Reference numeral 51 denotes an objective lens which is arranged on the line X—X at the side of the light-receiving surface of the MD 100 or the CD 300 and has at least a function of applying a laser beam onto the data recording surface of the MD 100 or the CD 300. Reference numeral 50 denotes an optical head which is provided with the objective lens 51 and has a function of executing at least playback of the MD 100 and the CD 300 by generating a laser beam and leading the beam to the objective lens 51. Reference numeral 52 denotes a pair of guide rails 52 of which an axial center is arranged in parallel with the line X—X. The guide rails 52 are slidably engaged with the optical head 50 and have a length allowing the objective lens 51 to access the data recording area of the MD 100 and the CD 300. Reference numeral 53 denotes a cartridge including therein the MD 100.

The following describes the operation of the optical disc apparatus having the above-mentioned construction.

When the MD 100 is loaded on the MD turntable 200, playback of data can be performed by conventional means by virtue of the fact that the guide rails 52 have a length sufficient for allowing the objective lens 51 to cover the data recording area of the MD 100. In the above case, the distance from the disc receiving section 3 to the data recording surface 1a of the MD 100 is 2.0 mm which is the same as in the conventional example. Assuming that the distance from the objective lens 51 to the data recording surface 1a of the MD 100 is H3, the distance from the objective lens 51 to the disc receiving section 3 is (H3−2.0) mm. In the above case, the cartridge 53 including the MD 100 does not interfere with the CD turntable 400.

When the CD 300 is loaded on the CD turntable 400, the MD turntable 200 does not interfere with the CD 300 because the MD turntable 200 is separated apart from the CD 300 by a distance sufficient for avoiding mutual interference. The objective lens 51 moves along the line X—X, and therefore it accesses the CD 300 in the radial direction of the disc. In the above case, the distance from the disc receiving section 13 to the data recording surface of the CD 300 is 1.2 mm in the same architecture as in the description of the conventional example. However, the disc receiving section 13 of the CD turntable 400 is positioned higher by 0.8 mm than the disc receiving section 3 of the MD turntable 200 in the z-axis direction. Therefore, the distance from the objective lens 51 to the disc receiving section 13 is L5−2.0+0.8=L5−1.2. For the reason that the distance from the disc receiving section 13 to the data recording surface 11a of the CD 300 is 1.2 mm, the distance from the objective lens 51 to the data recording surface 11a is L5−1.2+1.2=L5. In other words, the data recording surface 1a of the MD 100 and the data recording surface 11a of the CD 300 are put at an equal distance from the objective lens 51, and therefore the CD 300 can be subjected to playback when the MD 100 can be played back.

According to the present embodiment as described above, by providing the MD turntable 200, the CD turntable 400, and the objective lens 51 which moves along the line that connects both the turntables, positioning both turntables apart by a distance sufficient for avoiding interference of the CD 300 with the MD turntable 200 when the CD 300 is clamped on the CD turntable 400, and arranging the disc receiving section 3 of the MD turntable 200 in a position 0.8 mm below the disc receiving section 13 of the CD turntable 400, the objective lens 51 can compatibly access either of the MD 100 or the CD 300 in the radial direction of the discs. Furthermore, the data recording surfaces 1a and 11a are put at an equal distance from the objective lens 51, and therefore either of the discs can be subjected to data playback in the same condition.

Fifth Embodiment

The following describes an optical disc apparatus in accordance with a fifth embodiment of the present invention with reference to the attached drawings.

The purpose of the present embodiment is to provide an optical disc apparatus which can at least play back either of the CD and the MD compatibly with use of a single drive unit.

Figure 7:
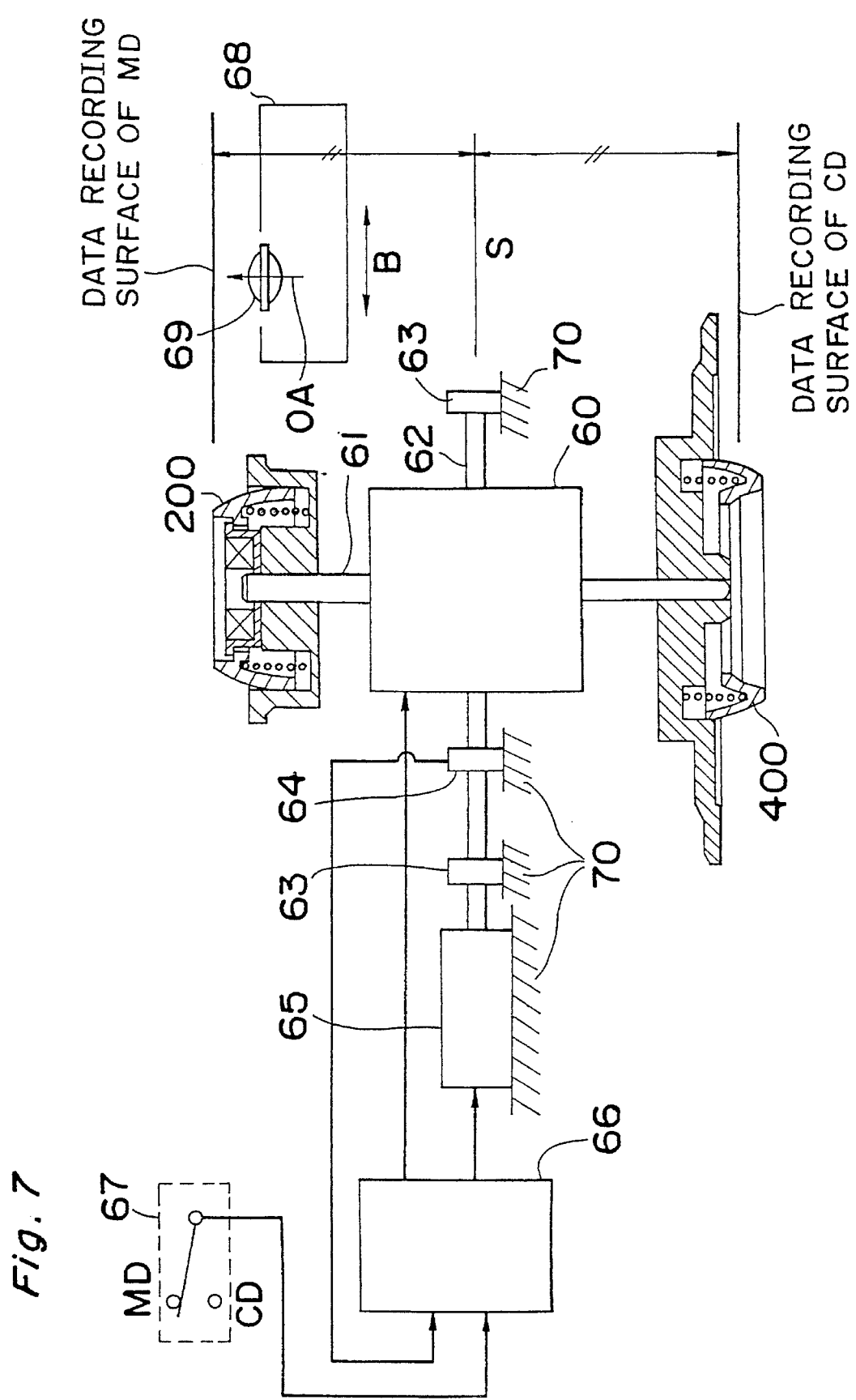
FIG. 7 is an explanatory view of an optical disc apparatus in accordance with a fifth embodiment of the present invention.

FIG. 7 shows an optical disc apparatus in accordance with the fifth embodiment of the present invention.

The MD turntable 200 and the CD turntable 400 are the same as those of the conventional example. An optical head 68 and an objective lens 69 have the same functions as those of the optical head 50 and the objective lens 51 of the fourth embodiment though they have different configurations. The objective lens 69 has its optical axis OA. The optical head 68 and the objective lens 69 move in the direction indicated by an arrow B in FIG. 7.

Reference numeral 70 denotes a base of the apparatus, reference numeral 60 denotes a spindle motor having a rotary shaft 61 connected to the rotor of the spindle motor 60. The spindle motor 60 rotates its rotary shaft 61 forwardly and reversely, and stops the rotary shaft 61 according to input signals. It is noted here that the forward rotation direction of the MD turntable 200 is defined to be "forward", and the reverse rotation direction thereof is defined to be "reverse".

Reference numeral 62 denotes a pivot shaft which is arranged in parallel in the direction indicated by the arrow B as fixed to the stator of the spindle motor 60. One end of the pivot shaft 62 is connected to a motor 65. The motor 65 rotates and stops the pivot shaft 62 according to an input signal. The other end of the pivot shaft 62 is supported by a pivot support member 63 which is composed of a radial bearing or the like to pivotally support the pivot shaft 62 with respect to the base 70. Reference numeral 64 denotes a condition detecting section 64 which optically detects the rotational position of the pivot shaft 62 with respect to the base 70 to generate a detection signal. The condition detecting section 64 generates an MD setting completion signal when the rotary shaft 61 of the spindle motor 60 is put in parallel with the optical axis OA with the MD turntable 200 set in the upper position, while the condition detecting section 64 generates a CD setting completion signal when the rotary shaft 61 is put in parallel with the optical axis OA with the CD turntable 400 set in the upper position.

Reference numeral 67 denotes a selection switch which outputs a signal for selecting between playback of the MD and the playback of the CD according to the condition of the switch. Reference numeral 66 denotes a control section which receives a selection signal from the selection switch 67 and a signal from the condition detecting section 64 to supply a rotation signal and a stop signal to the motor 65 and supply a forward rotation permission signal, a reverse rotation permission signal, and a stop signal to the spindle motor 60 according to the inputs from the selection switch 67 and the condition detecting section 64. The control section 66 outputs a rotation signal to the motor 65 until an MD setting completion signal is input from the condition detecting section 64 when the MD selection signal is supplied from the selection switch 67. When the motor 65 is rotating, the stop signal is continuously output to the spindle motor 60. Subsequently, when the MD setting completion signal is input from the condition detecting section 64, the control section 66 outputs the stop signal to the motor 65 and outputs the forward rotation permission signal to the spindle motor 60. When a CD selection signal is supplied from the selection switch 67 to the control section 66, the control section 66 outputs the rotation signal to the motor 65 until the CD setting completion signal is supplied from the selection switch 67. When the motor 65 is rotating, the stop signal is continuously output to the spindle motor 60. Subsequently, when the CD setting completion signal is input from the condition detection section 64, the control section 66 outputs the stop signal to the motor 65 and outputs the reverse rotation permission signal to the spindle motor 60.

The pivot shaft 62 has its center axis S arranged at an equal distance from the data recording surface of the MD and the data recording surface of the CD when the discs are clamped on their respective turntables as shown in FIG. 7.

The following describes the operation of the optical disc apparatus having the above-mentioned construction.

First, when the MD is selected by the selection switch 67 to direct the MD turntable 200 upward as shown in FIG. 7, the selection switch 67 outputs the MD selection signal to the control section 66, while the condition detecting section 64 outputs the MD setting completion signal to the control section 66. Then the control section 66 outputs the stop signal to the motor 65 and outputs the forward rotation permission signal to the spindle motor 60. When a play switch (not shown) is pressed in the above condition, the spindle motor 60 rotates forwardly.

Next, when the CD is selected by the selection switch 67 to direct the MD turntable 200 upward as shown in FIG. 7, the selection switch 67 outputs the CD selection signal to the control section 66, while the condition detecting section 64 outputs the CD setting completion signal to the control section 66. Then the control section 66 outputs the rotation signal to the motor 65 and outputs the stop signal to the spindle motor 60. Thus the motor 65 rotates, and the pivot shaft 62 connected to the motor 65 pivots around the axis S to pivot the spindle motor 60 connected to the pivot shaft 62 around the axis S. When a play switch (not shown) is pressed in the above condition, the motor shaft 61 does not rotate because the stop signal is output to the spindle motor 60.

Subsequently, when the CD turntable 400 is directed upward to make the rotary shaft 61 of the motor put in parallel with the optical axis OA, the condition detecting section 64 outputs the CD setting completion signal to the control section 66. The control section 66 outputs the stop signal to the motor 65 upon reception of the CD setting completion signal and outputs the reverse rotation permission signal to the spindle motor 60. When the play switch (not shown) is pressed at this time, the spindle motor 60 rotates reverse. Since the distance from the axis S to the data recording surface of the MD is equal to the distance from the axis S to the data recording surface of the CD, the distance from the objective lens 69 to either of the discs is identical when either of the MD or CD is subjected to playback.

According to the present embodiment as described above, the optical disc apparatus is provided with the reversible spindle motor 60 having at its one end the MD turntable 200 and at its other end the CD turntable 400, the pivot shaft 62 which is fixed to the spindle motor 60 being connected at its one end to the motor 65 and supported by the pivot support member 63 on the base. The optical disc apparatus further comprises the condition detecting section 64 which detects the rotation angle of the pivot shaft 62, the selection switch 67 which selects between the MD and the CD, and the control section 66 which outputs signals to the motor 65 and the spindle motor 60 based on the input signals from the selection switch 67 and from the condition detecting section 64, where the center axis S of the pivot shaft 62 is put at an equal distance from the data recording surface of the MD and from the data recording surface of the CD. Therefore, the MD and the CD can be compatibly driven by one spindle motor 60 in the optical disc apparatus, so that the data recording surfaces of the discs can be treated equally viewing from the objective lens 69.

Although the present invention has been fully described by way of example with reference to the accompanying drawings, it is to be noted here that various changes and modifications will be apparent to those skilled in the art. Therefore, unless such changes and modifications otherwise depart from the scope of the present invention as defined by the appended claims, they should be construed as included therein.

What is claimed is:

1. An optical disc clamp mechanism for use in an optical disk playback apparatus to selectively clamp a compact disc, having a compact disc centering hole of a first diameter, a compact disc data recording surface and a compact disc clamping surface spaced from the compact disc data recording surface by a first predetermined axial distance, and a mini disc having a mini disc centering hole of a second diameter less than the first diameter, a mini disc data recording surface and a mini disc clamping surface spaced from the mini disc data recording surface by a second predetermined axial distance greater than the first predetermined axial distance, said optical disc clamp mechanism comprising:

a mini disc turntable including a portion adapted to be secured to a rotary shaft of a motor for rotation about a rotary axis, a mini disc receiving section for contacting the mini disc clamping surface of the mini disc, and a mini disc centering mechanism for centering the mini disc on said mini disc turntable;

a compact disc clamper rotatably mounted in facing relation to said mini disc turntable for rotation about said rotary axis; and wherein said compact disc clamper comprises:

a compact disc receiving section for contacting the compact disc data recording surface of the compact disc;

a spacer section having a base end fixed to said compact disc receiving section, said spacer section extending from said base end toward said mini disc turntable and being adapted to extend through the compact disc centering hole of the compact disc, said spacer section having a contact surface at a distal end thereof for contacting said mini disc receiving section of said mini disc turntable;

coupling means for coupling the compact disc to said compact disc clamper so that the compact disc data recording surface of the compact disc contacts said compact disc receiving section of said compact disc clamper, so that said spacer section extends through the compact disc centering hole of the compact disc and so that the compact disc is centered on said compact disc clamper;

clamper centering means for contacting said mini disc centering mechanism of said mini disc turntable and centering said compact disc clamper relative to said mini disc turntable; and wherein said spacer section comprises a means for causing an axial distance from said mini disc receiving section of said mini disc turntable to the compact disc data recording surface of the compact disc, when the compact disc is coupled to said compact disc clamper by said coupling means and said contact surface of said spacer section is contacted against said mini disc receiving section of said mini disc turntable, to be substantially equal to an axial distance from said mini disc receiving section of said mini disc turntable to the mini disc data recording surface of the mini disc when the mini disc clamping surface is contacted against said mini disc receiving section.

2. An optical disc clamp mechanism as recited in claim 1, wherein the second predetermined axial distance of the mini disc which said optical disc clamp mechanism is adapted to clamp is greater than the first predetermined axial distance of the compact disc which said optical disc clamp mechanism is adapted to clamp by 0.8 mm; and an axial distance by which said contact surface of said spacer section is spaced from the compact disc when the compact disc is coupled to said compact disc clamper by said coupling means is 0.8 mm.

3. An optical disc clamp mechanism as recited in claim 1, wherein the second predetermined axial distance of the mini disc which said optical disc clamp mechanism is adapted to clamp is greater than the first predetermined axial distance of the compact disc which said optical disc clamp mechanism is adapted to clamp by an amount equal to an axial distance by which said contact surface of said spacer section is spaced from the compact disc when the compact disc is coupled to said compact disc clamper by said coupling means.

4. An optical disc clamp mechanism as recited in claim 1, wherein said coupling means comprises at least three elastic members mounted to said spacer section and creating at least three radially outwardly directed biasing forces.

5. An optical disc clamp mechanism as recited in claim 1, wherein said spacer section is cylindrical and has at least three radially outwardly opening bores formed therein and spaced thereabout at approximately equal angular intervals; and said coupling means comprises a plurality of springs respectively mounted in said bores.

6. An optical disc clamp mechanism as recited in claim 5, wherein said coupling means further comprises a plurality of balls respectively mounted in said bores radially outwardly of said springs.

7. An optical disc clamp mechanism as recited in claim 6, wherein ball retaining pawl sections are formed about said bores at a periphery of said spacer section to retain said balls, respectively;

a tip of a portion of each of said pawl sections located closest to said compact disc receiving section is spaced from said compact disc receiving section by less than the first predetermined axial distance; and said balls are positioned such that center lines therethrough which are perpendicular to said rotary axis are spaced from said compact disc receiving section by greater than the first predetermined axial distance.

8. An optical disc clamp mechanism as recited in claim 1, wherein said clamper centering means comprises a hole in said spacer section having an axis along said rotary axis; and said hole comprising said clamper centering means has a diameter substantially equal to the second diameter of the mini disc centering hole.

9. An optical disc clamp mechanism as recited in claim 1, wherein said compact disc clamper further comprises a magnetic member fixation surface; and a magnetic member is fixed to said magnetic member fixation surface of said compact disc clamper so as to face said mini disc turntable.

10. An optical disc clamp mechanism for adapting a first type of optical disc for playback in an optical disc apparatus arranged for playback of a second type of optical disc, where the first type of optical disc has a first centering hole, a first data recording surface and a first clamping surface spaced from the first data recording surface by a first predetermined axial distance, and where the optical disc apparatus has a turntable adapted to clamp, against a disc receiving surface thereof, the second type of optical disc which has a second centering hole, a second data recording surface and a second clamping surface spaced from the second data recording surface by a second predetermined axial distance greater than the first predetermined axial distance, said optical disc clamp mechanism comprising:

a disc clamper having means for receiving and retaining the first type of optical disc;

a means for clamping said disc clamper to the turntable of the disc playback apparatus;

wherein said disc clamper comprises:

a disc receiving section for contacting the first data recording surface of the first type of optical disc when the first type of optical disc is received and retained by said disc clamper; and a spacer section which has a base end fixed to said disc receiving section, which has a distal end at which a contact surface is defined for contacting the disc receiving surface of the turntable and which, when the first type of optical disc is received and retained by said disc clamper, protrudes through the first centering hole of the first type of optical disc such that said contact surface is spaced away from the first clamping surface of the first type of optical disc by an axial distance approximately equal to a difference between the first predetermined axial distance of the first type of optical disc and the second predetermined axial distance of the second type of optical disc.

11. An optical disc clamp mechanism as recited in claim 10, wherein the first type of optical disc is a compact disc and the second type of optical disc is a mini disc; and said axial distance by which said contact surface is spaced away from the first clamping surface of the first type of optical disc is 0.8 mm.

12. An optical disc apparatus for use in selectively playing back a first type of optical disc having a first centering hole, a first data recording surface and a first clamping surface spaced from the first data recording surface by a first predetermined axial distance and a second type of optical disc having a second centering hole, a second data recording surface and a second clamping surface spaced from the second data recording surface by a second predetermined axial distance greater than the first predetermined axial distance, said optical disc apparatus comprising:

a turntable for clamping, against a disc receiving surface thereof, the second type of optical disc; and an optical disc clamp mechanism comprising:

a disc clamper having means for receiving and retaining the first type of optical disc;

a means for clamping said disc clamper to said turntable; and wherein said disc clamper comprises a disc receiving section for contacting the first data recording surface of the first type of optical disc when the first type of optical disc is received and retained by said disc clamper, and a spacer section which has a base end fixed to said disc receiving section, which has a distal end at which a contact surface is defined for contacting said disc receiving surface of said turntable and which, when the first type of optical disc is received and retained by said disc clamper, protrudes through the first centering hole of the first type of optical disc such that said contact surface is spaced away from the first clamping surface of the first type of optical disc by an axial distance approximately equal to a difference between the first predetermined axial distance of the first type of optical disc and the second predetermined axial distance of the second type of optical disc.

* * * * *